(12) United States Patent (10) Patent No.: US 9,032,148 B2
Agombar et al. (45) Date of Patent: *May 12, 2015

(54) RAID ARRAY TRANSFORMATION IN A POOLED STORAGE SYSTEM

(71) Applicant: International Business Machines Corporation, Armonk, NY (US)

(72) Inventors: John P. Agombar, Winchester (GB); Matthew J. Fairhurst, Winchester (GB); John E. Lindley, San Jose, CA (US); Lee J. Sanders, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,347

(22) Filed: Jan. 9, 2014

(65) Prior Publication Data

US 2014/0129768 A1 May 8, 2014

Related U.S. Application Data

(63) Continuation of application No. 13/223,160, filed on Aug. 31, 2011, now Pat. No. 8,677,066.

(30) Foreign Application Priority Data

Oct. 7, 2010 (EP) .................................. 10186887

(51) Int. Cl.
*G06F 12/00* (2006.01)
*G06F 3/06* (2006.01)
*G06F 11/10* (2006.01)

(52) U.S. Cl.
CPC .......... *G06F 3/0689* (2013.01); *G06F 11/1076* (2013.01); *G06F 3/061* (2013.01); *G06F 3/0665* (2013.01)

(58) Field of Classification Search
CPC ............ G06F 11/1076; G06F 11/1084; G06F 11/1662; G06F 11/2094; G06F 2211/1028; G06F 3/0607; G06F 3/061; G06F 3/0631; G06F 3/0632; G06F 3/067; G06F 3/0689; G06F 3/0665; G06F 3/0685; G06F 3/0647; G06F 11/1096; G06F 3/0608; G06F 2211/1004; G06F 3/0634
USPC .................................................. 711/114, 165
See application file for complete search history.

(56) References Cited

U.S. PATENT DOCUMENTS 5,542,065 A 7/1996 Burkes et al.
5,574,851 A 11/1996 Rathunde
(Continued)

FOREIGN PATENT DOCUMENTS

EP 1564634 8/2005
WO WO2004036424 4/2004
WO WO2012045529 4/2012

OTHER PUBLICATIONS

Non-Final Office Action from U.S. Appl. No. 13/223,160 dated Feb. 28, 2013.
(Continued)

*Primary Examiner* — Hashem Farrokh
(74) *Attorney, Agent, or Firm* — Zilka-Kotab, PC

(57) ABSTRACT

Aspects of the present invention relate to an apparatus and corresponding method that includes reading data from a first portion of an in-use redundant array of independent disks (RAID), wherein the first portion of the in-use RAID is arranged according to a first array configuration having at least a first parameter. One or more reserved extents in a storage pool is used to store at least a first portion of the data for writing to the in-use RAID. One or more free extents in the storage pool and/or in the in-use RAID is used to store at least a second portion of the data for writing to the in-use RAID. The data is written to a second portion of the in-use RAID. The second portion of the in-use RAID is arranged according to a second array configuration having at least a second parameter.

20 Claims, 4 Drawing Sheets

(56) References Cited

U.S. PATENT DOCUMENTS

| | | | |
|---|---|---|---|
| 6,052,759 A * | 4/2000 | Stallmo et al. | 711/114 |
| 6,898,668 B2 | 5/2005 | Thompson et al. | |
| 7,454,566 B1 | 11/2008 | Overby | |
| 7,702,850 B2 | 4/2010 | Ludwig et al. | |
| 7,721,044 B1 | 5/2010 | Chatterjee et al. | |
| 7,873,619 B1 * | 1/2011 | Faibish et al. | 707/705 |
| 8,677,066 B2 | 3/2014 | Agombar et al. | |
| 2004/0172503 A1 | 9/2004 | Merchant | |
| 2008/0005612 A1 * | 1/2008 | Arai | 714/6 |
| 2008/0109601 A1 | 5/2008 | Klemm et al. | |
| 2011/0264855 A1 * | 10/2011 | Kasako | 711/114 |
| 2012/0089777 A1 | 4/2012 | Agombar et al. | |
| 2013/0205086 A1 | 8/2013 | Brown et al. | |

OTHER PUBLICATIONS

Notice of Allowance and Fee(s) Due from U.S. Appl. No. 13/223,160 dated Jul. 24, 2013.
Notice of Allowance and Fee(s) Due from U.S. Appl. No. 13/223,160 dated Oct. 31, 2013.
International Search Report and Written Opinion from PCT application No. PCT/EP2011/064976 dated Oct. 5, 2011.
European Application No. 10186891.7 filed Oct. 7, 2010.

* cited by examiner

RAID ARRAY TRANSFORMATION IN A POOLED STORAGE SYSTEM

RELATED APPLICATIONS

This application is a continuation of U.S. patent application Ser. No. 13/223,160 filed Aug. 31, 2011, which claims priority from European Patent Application No. 10186887.5 filed Oct. 7, 2010, from each of which priority is claimed and which are herein incorporated by reference.

BACKGROUND

The present invention relates to the control of RAID storage, and particularly to the transformation of RAID storage in a virtualized storage environment.

In a storage system where data is stored on one or more redundant-arrays of independent disks (RAID), parameters such as the number of disks in the RAID, the size of the disks in the RAID and the RAID level used are usually fixed at array creation time. Once an array has been created and data has been stored in it, it is usually not possible to change any of these parameters without deleting the array, destroying all the data, and re-creating the array with the new parameters.

Some conventional storage systems allow limited expansion of an array, e.g., from an array using RAID-5 with five disks to an array using RAID-5 with 8 disks. However, this is currently accomplished by putting new capacity contiguously on the three new disks, and then recalculating the parity that already exists on the original five disks. Unfavorably, the new data is not striped across the array, and therefore the new disks do not contribute to the parity overhead, which ultimately means the performance of systems created using this method is interior to that of freshly created RAID-5 arrays with the same number of disks. Moreover, some conventional storage systems allow expansion from RAID-5 to RAID-6 with the addition of a single disk, but even in cases allowing such an expansion, this is the only transformation allowed.

One conventional example of a facility for expanding an array by adding one or more new disks is disclosed in published PCT Patent Appl. No. WO 2004/036424, which describes the transformation of an array to take advantage of the additional disk resource by a mechanism that scatters a subset of the existing data across the new disk space and subsequently inserts data in the remaining new disk space. Disadvantageously, one consequence of such conventional approaches is that the layout of the data is substantially changed in the post-transformation array.

In other methods, it is possible to perform transformations of an in-use array using RAID by reserving extents in each array upon creation of the array, and furthermore ensuring that the reserved extents are isolated from normal use, such that they can be brought into use during an array transformation. In this type of transformation, the system uses the reserved extents from the array to create a destination for data being moved as part of the transformation. Once the data is moved, the previous storage location is free for use, and is utilized as the destination for subsequent data to be moved, and so on, in the manner of a "sliding window." However, in this approach, there is the unfortunate potential for mismatch between RAID stripes and underlying extents. Thus, when employing this methodology, the at least three extents should be statically reserved on each array. The number of reserved extents may also be increased to allow the transformation system to increase the number of extent migrations in progress at any one time.

While the ability to perform array transformations in this way is advantageous in systems of limited size, in large-scale systems, a concomitant disadvantage exists. The primary drawback of requiring statically reserved extents on each array from the time of its creation is that the number of reserved extents may only be chosen at array creation time, and cannot be specified or reserved at a later time. Moreover, once the reserve extents are created, it is difficult to alter their structure or the number of reserved extents within the array. As a result, in these conventional approaches, the effective capacity of the arrays is reduced, impacting system performance and frustrating one goal of RAID usage.

BRIEF SUMMARY OF INVENTION

A method according to one embodiment includes reading data from a first portion of an in-use redundant array of independent disks (RAID), wherein the first portion of the in-use RAID is arranged according to a first array configuration having at least a first parameter. One or more reserved extents in a storage pool is used to store at least a first portion of the data for writing to the in-use RAID. One or more free extents in the storage pool and/or in the in-use RAID is used to store at least a second portion of the data for writing to the in-use RAID. The data is written to a second portion of the in-use RAID. The second portion of the in-use RAID is arranged according to a second array configuration having at least a second parameter.

An apparatus according to one embodiment includes a control configured to perform the foregoing method.

A computer program product according to one embodiment includes a computer readable storage medium having computer readable program code embodied therewith, the computer readable program code including computer readable program code configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
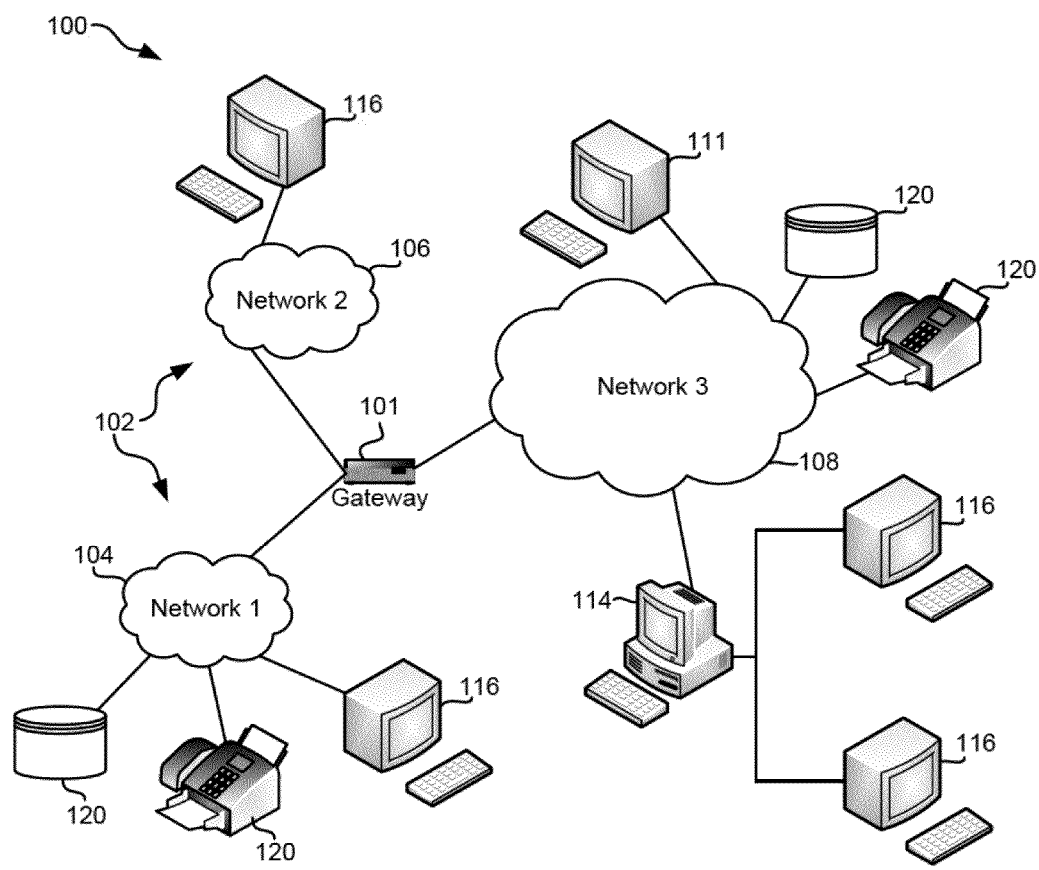
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for transforming an in-use redundant array of independent disks (RAID) from a first array configuration having at least a first parameter to a second array configuration having at least a second parameter.

According to one general embodiment a system includes an extent reserving component adapted for reserving one or more extents in a storage pool, a data migrating component adapted for reading data from a first portion of an in-use RAID, wherein the first portion of the in-use RAID is arranged according to a first array configuration having at least a first parameter, using the one or more reserved extents in the storage pool to store at least a first portion of the data for writing to the in-use RAID, using one or more free extents in the storage pool or in the in-use RAID to store at least a second portion of the data for writing to the in-use RAID, and writing the data to a second portion of the in-use RAID, wherein the second portion of the in-use RAID is arranged according to a second array configuration having at least a second parameter. The system also includes a first I/O component adapted for performing one or more first I/O operations according to the first array configuration, wherein the one or more first I/O operations are performed on the data before the data is read by the data migrating component and a second I/O component adapted for performing one or more second I/O operations according to a second array configuration, wherein the second I/O operations are performed on the data after the data is read by the data migrating component, wherein a logical data structure of the in-use RAID is preserved.

In another general embodiment, a method includes reserving one or more extents in a storage pool, reading data from a first portion of an in-use RAID, wherein the first portion of the in-use RAID is arranged according to a first array configuration having at least a first parameter, using the one or more reserved extents in the storage pool to store at least a first portion of the data for writing to the in-use RAID, using one or more free extents in the storage pool or in the in-use RAID to store at least a second portion of the data for writing to the in-use RAID, writing the data to a second portion of the in-use RAID, wherein the second portion of the in-use RAID is arranged according to a second array configuration having at least a second parameter, performing one or more first I/O operations according to the first array configuration, wherein the one or more first I/O operations are performed on the data before the data is read by the data migrating component, and performing one or more second I/O operations according to a second array configuration, wherein the second I/O operations are performed on the data after the data is read by the data migrating component, wherein a logical data structure of the in-use RAID is preserved.

In another general embodiment, a computer program product includes a non-transitory computer readable storage medium having computer readable program code embodied therewith, the computer readable program code including computer readable program code configured to reserve one or more extents in a storage pool, computer readable program code configured to read data from a first portion of an in-use RAID, wherein the first portion of the in-use RAID is arranged according to a first array configuration having at least a first parameter, computer readable program code configured to use the one or more reserved extents in the storage pool to store at least a first portion of the data for writing to the in-use RAID, computer readable program code configured to use one or more free extents in the storage pool or in the in-use RAID to store at least a second portion of the data for writing to the in-use RAID, computer readable program code configured to write the data to a second portion of the in-use RAID, wherein the second portion of the in-use RAID is arranged according to a second array configuration having at least a second parameter, computer readable program code configured to perform one or more first I/O operations according to the first array configuration, wherein the one or more first I/O operations are performed on the data before the data is read by the data migrating component, and computer readable program code configured to perform one or more second I/O operations according to a second array configuration, wherein the second I/O operations are performed, on the data after the data is read by the data migrating component, wherein a logical data structure of the in-use RAID is preserved.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal wife, computer readable program code embodied therein, for example, in baseband or as part of a carrier wave. Such a propagated signal may take any of a variety of forms, including, but not limited to, electro-magnetic, optical, or any suitable combination thereof. More specific examples (a non-exhaustive list) of the computer readable signal medium would include the following: an electrical connection having one or more wires, an optical fiber, etc. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Generally speaking, preferred embodiments capable of RAID transformation in pooled storage as described herein include systems, methods, and computer program products incorporating features as follows.

In one embodiment, a system includes an extent reserving component which is adapted for reserving one or more extents in a storage pool in operation of a method and/or computer program product. Furthermore, the system includes a data migrating component which, in the course of executing a method and/or computer program product, is adapted for reading data from a first portion of an in-use RAID arranged according to a first array configuration having at least a first parameter, using reserved extents in the storage pool to store at least a first portion of the data for writing to the in-use RAID, using free extents in the storage pool or in the in-use RAID to store at least a second portion of the data for writing to the in-use RAID, and writing the data to a second portion of the in-use RAID. In these configurations, the second portion of the in-use RAID is arranged according to a second array configuration having at least a second parameter.

Further still, the system includes a first I/O component adapted for performing I/O operations on the data according to the first array configuration before the data is read by the data migrating component and a second I/O component adapted for performing I/O operations on the data according to a second array configuration after the data is read by the data migrating component. Advantageously, systems including these components preserve the logical data structure of the in-use RAID during operation.

Alternative embodiments of the system as disclosed herein may include additional features and functionality, such as at least one parameter, including any or all of the following: a number of disks, a disk storage capacity, an array storage capacity, a RAID level, etc., as would be understood by one having ordinary skill in the art upon reading the present descriptions.

Moreover, in preferred embodiments, any given array configuration may be characterized by having a different number of disks, a different storage capacity, and/or a different RAID level than that of other configurations.

Referring specifically to the RAID, any RAID configuration as understood by those having ordinary skill in the art as being capable of transforming data from one portion of the RAID to another portion of the RAID while preserving the logical data structure of the data may be utilized. In one embodiment, such a RAID includes a first plurality of disks having a first capacity, and a second plurality of disks having a second capacity, where a first array configuration uses the first plurality of disks and the second plurality of disks, and a second array configuration uses either the first plurality of disks or the second plurality of disks. Moreover, in some embodiments the first capacity may be different than the second capacity.

The embodiments described above are made with primary reference to a system having the specified functionality, but as would be understood by those having ordinary skill in the art, the system may be used in conjunction with a process and/or computer program product designed to carry out the operations described for each of the various system components. Moreover, the process and computer program product may be utilized with any system capable of transforming data in a RAID while preserving the logical structure of the data, as would be understood by one having ordinary skill in the art upon reading the present descriptions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g. facsimile machines, printers, networked and/or local storage units or systems, etc., may be coupled to one or more of the networks 104, 106, 108. It should be noted that databases and/or additional components may be be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
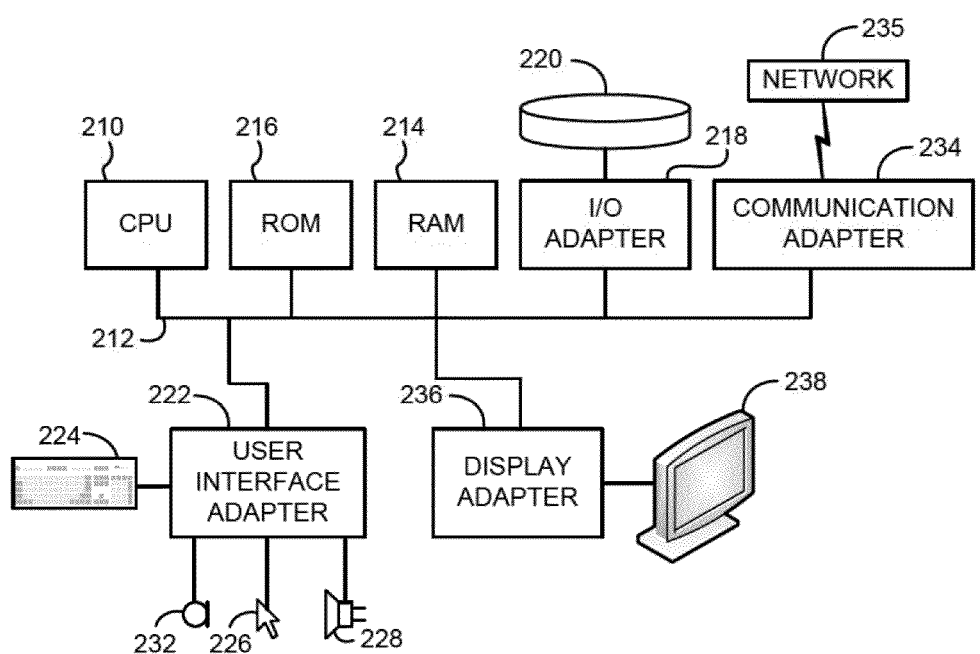
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), winch has become increasingly used to develop complex applications, may be used.

In conventional storage systems where data is stored on one or more arrays using RAID (hereinafter referred to as "RAID arrays"), parameters such as the number of disks in the RAID arrays, the size of the disks in the RAID arrays and the RAID level used are fixed at array creation time in conventional methods. Once an array has been created and data has been stored on it, it is typically impossible to change any of these parameters without deleting the RAID array, destroying all the data, and re-creating the array with the new parameters.

In its broadest application, a preferred embodiment provides a system, method of operation, and computer program for controlling virtualized volumes stored on RAID arrays, adapted to migrate data from one part of a RAID array to another without affecting the logical address that is used to address the data, and without requiring any RAiD-creation-time reservation of extents at each RAID array.

Moreover, preferred embodiments address the shortcomings of the state of the art by providing enhanced control of the location of the virtualized data, and the upfront reservation of spare capacity in accessible storage pools, thereby making it possible to transform the underlying RAID array from one set of parameters to another, in place, without destruction of data, and in a way that means the resulting data layout is the same as, or close to the same as would be expected if a new RAID array was created with the new parameters.

Figure 3:
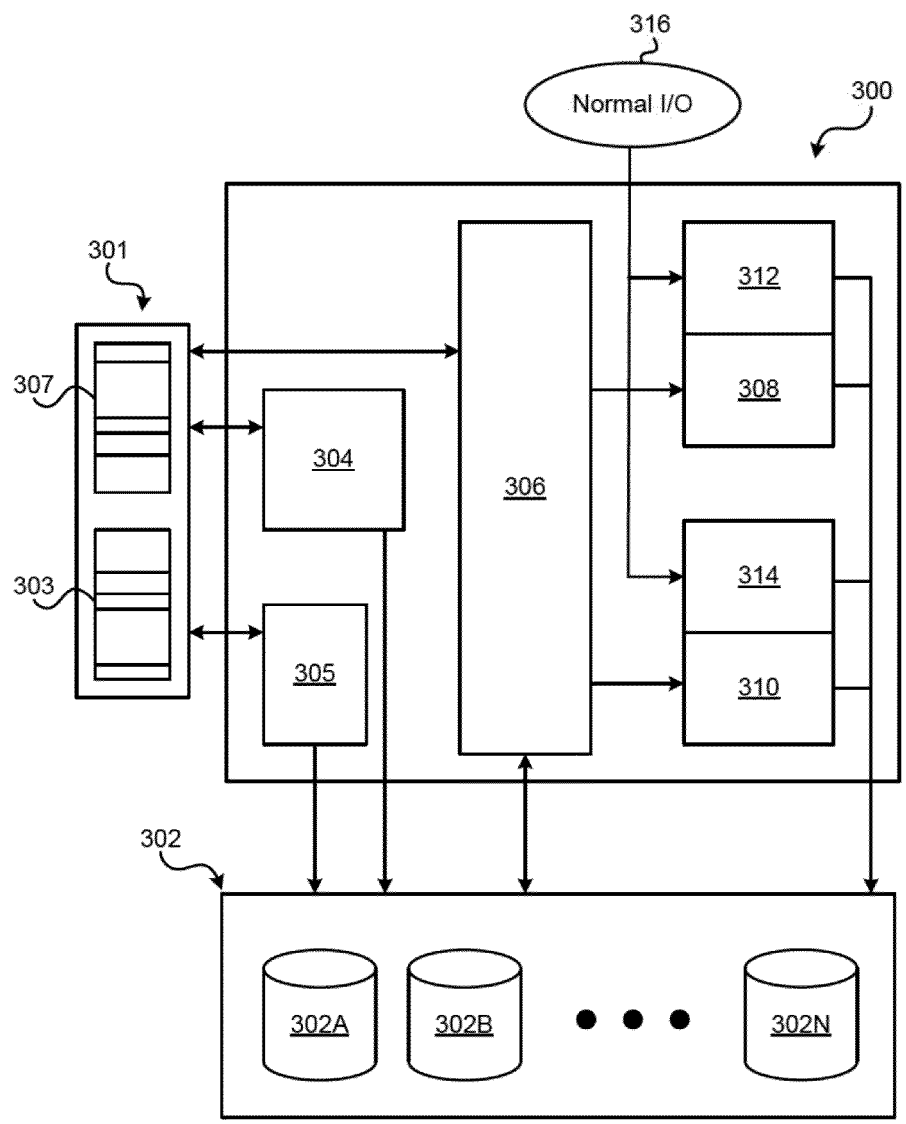
FIG. 3 shows an in-use RAID transformation system, according to one embodiment.

Referring now to FIG. 3, a simplified schematic of a system 300 is shown according to one embodiment. Specifically, FIG. 3 shows a transformation system 300 for transforming an in-use RAID array 302 from a first array configuration 308 to a second array configuration 310, all while preserving a logical data structure (not shown) of the in-use RAID array 302. The RAID array 302 comprises any number of independent disks 302A, 302B, . . . , 302N, as would be appreciated by one of skill in the art. Additionally, the system 300 may comprise any number of other RAID arrays (not shown). The system 300 also includes a pool extent reservation component 304 for reserving one or more reserved extents 307 in a storage pool 301. The reserved extents may be reserved prior to the pool extent reservation component 304 reserving them (in which case they are allocated for use with the RAID array 302) or it may reserve the extents for the first time.

According to preferred embodiments, the system 300 also includes a data migrating component 306 for reading data from a first portion of the in-use RAID array 302 arranged according to the first array configuration 308, and writing the data to a second portion of the in-use RAID array 302 arranged according to the second array configuration 310 using one or more of the reserved extents 307 in the storage pool 301 or one or more free extents 303 acquired at runtime from the storage pool 301 by a free extent locate and acquire component 305.

In more embodiments, the system 300 further includes a first I/O component 312 adapted for performing I/O operations according to the first array configuration 308 on data prior to the data migration component 306 performing a read operation, and also a second I/O component 314 adapted for performing I/O operations according to the second array configuration 310 on data after the data migration component 306 writes the data.

Furthermore, the second array configuration 310 may include a greater or lesser number of disks than the first array configuration 308, e.g., a different number of disks, in one embodiment. In another embodiment, the second array configuration 301 may comprise a greater storage capacity than the first array configuration 308, e.g., a different storage capacity. Further still, in another embodiment, the disks in the second array configuration 310 may have a higher or lower RAID level than a RAID level of the first array configuration 308, e.g., a different RAID level. Thus the system 300 may transform the RAID array 302 by changing the array configuration parameters, for example, by changing the number of disks in the array, the disk capacities, the RAID level, and/or other parameters as would be understood by one having ordinary skill in the art upon reading the present descriptions.

As will be immediately clear to one of ordinary skill in the art, in preferred embodiments, similar transformations may be performed for any RAID arrays in the system 300 having access to storage pool 301. Moreover, the reserved extents 307 for storage pool 301 may be arranged in any suitable manner across accessible storage, the RAID array 302, other RAID arrays, etc. Similarly, in preferred embodiments, the free extent locate and acquire component 305 may be capable of locating and acquiring free extents 303 at runtime from any memory source, such as the RAID array 302, other RAID arrays, memory in the storage pool 301, etc.

Figure 4:
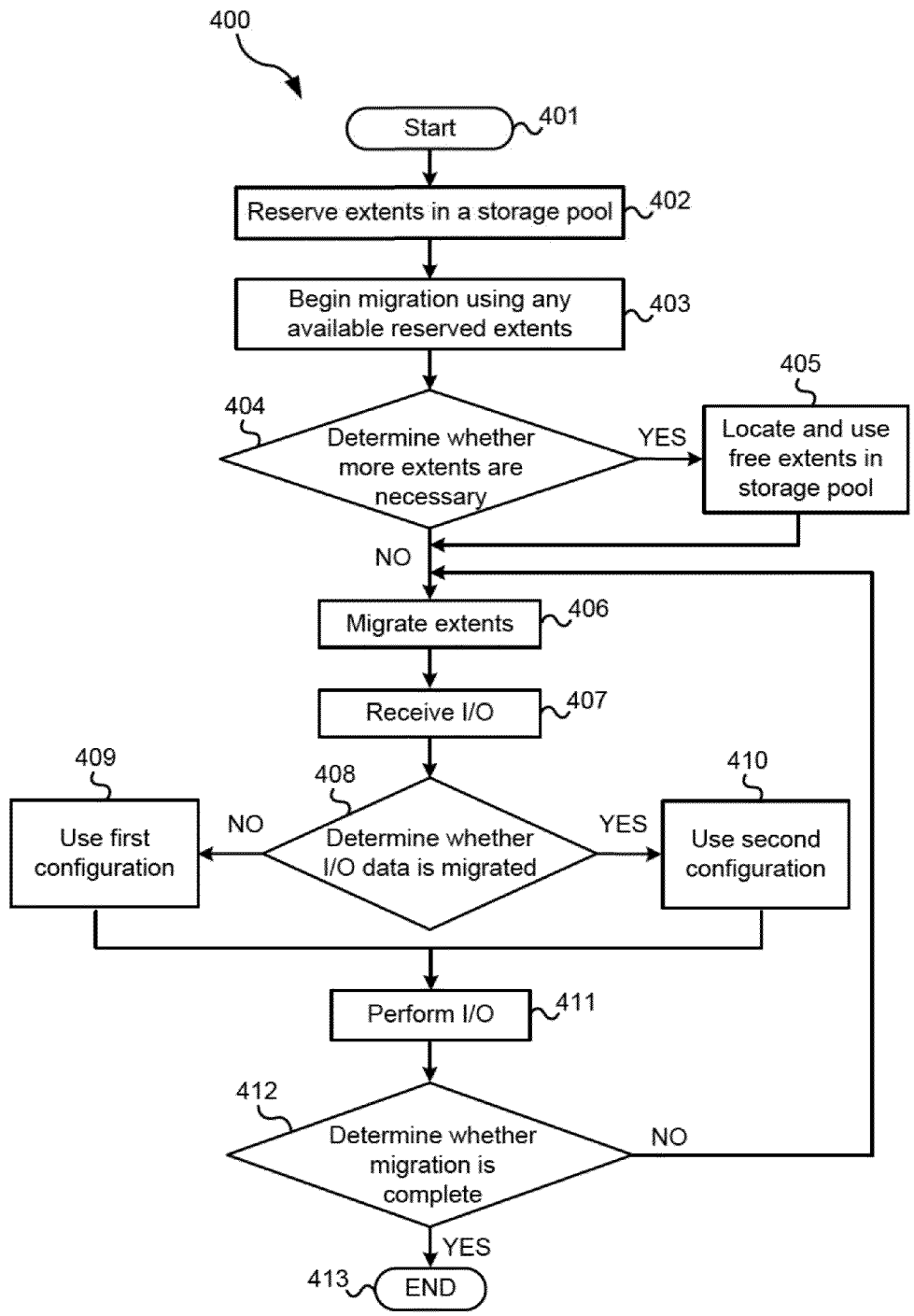
FIG. 4 shows a flowchart of a method, according to one embodiment.

Referring now to FIG. 4, a method 400 for transforming a RAID array from a first configuration to a second configuration is shown according to one embodiment. The method 400 may be carried out in any desired environment, including those described in FIGS. 1-3, according to various embodiments.

The method 400 starts at step 401, after which, extents in a storage pool are reserved at step 402. Preferably, extents are reserved when a first RAID array is added to the storage pool, but may optionally also be performed at any time during the lifetime of the storage pool. When a transformation is requested, the migration process begins using any available reserved extents at step 403. To ensure that the proper number of extents are created, the method further includes determining whether additional extents are necessary for the migration process in step 404.

Furthermore, in some embodiments, whenever step 404 determines that more extents are needed to perform the transformation, or that more extents are required because the transformation has been started at the same time as another transformation that is currently using the pool's reserved extents, free extents in the storage pool are located and acquired for use in step 405.

Next, the migration of extents proceeds at step 406 by using the reserved and/or acquired extents to provide space for writing the data. After data is written to the reserved and/or acquired extents, the original storage locations become available for further data migration. During the migration process, the I/O requests may continue to be received, as shown in step 407.

Subsequently, in step 408, it is determined if the I/O requests) refers to migrated or immigrated data. If the request refers to immigrated data (data which has not been written to the second portion of the RAID array yet), it is determined to use the first configuration, at step 409, to perform the I/O operation at step 411. Alternatively, if the request refers to migrated data (data which has already been written to the second portion of the RAID array), it is determined to use the second configuration, at step 410, to perform the I/O operation at step 411.

Furthermore, the migration process continues at step 412, where it is determined whether the migration has completed. If it has not completed, the method 400 returns to step 406 and further extents are migrated. The process completes when all of the required or requested migrations have been completed, as indicated at step 413.

In some embodiments, whenever an array transformation is initiated, the storage system may instantiate two views of the drives comprising the RAID array. The first view utilizes the old configuration parameters, and the second view uses the new configuration parameters. Initially, all operations may be performed using the old view of the drives and so I/O would proceed normally, as described above.

Furthermore, during the transformation process, a first set of data may be written from its original location on the RAID array to the reserved extents in the pool, according to one embodiment. When the reserved extents are filled, further extents may be acquired from among the free extents in the pool. As will be clear to one of ordinary skill in the art, once data has been written from one or more original extents on the RAID array, those original extents are freed and may be used to write further data, thus freeing yet more extents until all the extents have been migrated.

As will be clear to one of skill in the art, preferred embodiments are particularly useful in allowing the system, methods, and computer program products described herein to advantageously accept extensions and modifications to the resources available in a RAID storage system, even after initiation of the RAID array.

As described, the preferred system dynamically uses free extents and a small number of reserved extents from the storage pool to manage the transformations instead of having statically reserved extents at the end of every RAID array, to great advantage over conventional approaches. As a result, the effective capacity of each RAID array is not reduced. Instead, only very few extents required to support migrations and transformations in the storage pool are excluded from use at any given time.

In embodiments including a large configuration with many RAID arrays, mere is an additional advantage that significantly less space is held in reserve and thus unavailable to the user, ultimately allowing a greater utilization of the user's storage. As more free extents exist in the storage pool more transformations can be performed in parallel and therefore more extents per RAID array can be transformed in parallel.

Thus, instead of reserving the extents at the end of every RAID array, the system may reserve a small number of extents once when the storage pool is created and make use of those and other See extents within the storage pool to perform array transformations.

In a preferred embodiment, the system reserves, for example, five extents in the storage pool. These are hypothetical reservations, not reservations of any specific extents. Storage pool capacity reports exclude these extents, and therefore the extents do not limit use of the storage pool storage capacity. The system reserves the storage pool array transformation extents when the first RAID array is added to a storage pool, in one approach, and frees the extents when the last array is removed from a storage pool, in another approach.

By reserving the small number of extents in the storage pool, the transformation system is able to perform at least one array transformation at any time. As a result, the user is not burdened with ensuring that there are free extents in the system. Furthermore, users cannot put themselves into a position where they desire to add capacity by adding drives to existing arrays but are unable to do so because there are not enough free extents in the pool to be able to start an array transformation.

At the initiation of an array transformation, the transformation system may migrate extents from one end of the RAID array to the location of reserved extents or other free extents in the storage pool. As a result, free extents may be created and reserved at the end of the array being transformed. The system then proceeds with the transformation using these free extents within the RAID array as if they were reserved extents.

Preferred array transformations can advantageously use the reserved extents as well as any other free extents in the storage pool to perform array transformations, and the use of the additional free extents is particularly advantageous if more than one transformation is to be performed simultaneously.

It will be clear to one of ordinary skill in the art that there is a limit to the availability of free extents, and thus, if more transformations are invoked than there are free extents available to start, the transformations for which extents cannot be found are queued, according to one embodiment. If the first array transformations add capacity, when they complete, there will be additional free extents remaining available in the storage pool and more array transformations can subsequently be started utilizing those extents.

To enable accurate management and control of the storage pools, if there are sufficient free extents such that multiple array transformations may be performed at once, the storage pool capacities may be adjusted to exclude the extents already in use by the array transformation. The system is also operable to reject an I/O request for deletion of a RAID array or other volume deletion from the storage pool if there are still arrays in the storage pool and the deletions would eliminate the free space represented by the extents reserved in the storage pool for array transformations, in one approach. Similarly, the system may reject RAID array transformations that reduce the capacity of a RAID array if such transformations would eliminate the free space represented by the reserved extents, in another approach.

In some embodiments of storage virtualization devices, the user may be able to configure a warning threshold on the storage pool to alert the user if the storage pool's usage capacity is at a certain level within the total storage pool capacity. In such a system, the number of free extents used for array transformation may be restricted to keep array transformation from temporarily causing the system to cross the warning threshold.

It will be readily appreciated by one of ordinary skill in the art that various further modifications to the embodiments described herein are possible.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only; and not limitation. Thus, the breadth and scope of a preferred embodiment should not be limited by any of the above-described exemplary embodiments, but should be defined only in accordance with the following claims and their equivalents.

What is claimed is:

1. A system, comprising:
a data migrating component configured to:
read data from a first portion of an in-use redundant array of independent disks (RAID), wherein the first portion of the in-use RAID is arranged according to a first array configuration having at least a first parameter;
use one or more reserved extents in a storage pool to store at least a first portion of the data for writing to the in-use RAID;
use one or more free extents in the storage pool and/or in the in-use RAID to store at least a second portion of the data for writing to the in-use RAID; and
write the data to a second portion of the in-use RAID, wherein the second portion of the in-use RAID is arranged according to a second array configuration having at least a second parameter.

2. The system as recited in claim 1, wherein the first and second parameters comprise at least one of: a number of disks, a disk storage capacity, an array storage capacity, and a RAID level.

3. The system as recited in claim 1, wherein the second array configuration is characterized by having a different number of disks than the first array configuration.

4. The system as recited in claim 1, wherein the second array configuration is characterized by having a different storage capacity than the first array configuration.

5. The system as recited in claim 1, wherein the second array configuration is characterized by having a different RAID level than a RAID level of the first array configuration.

6. The system as recited in claim 1, wherein the RAID comprises:
a first plurality of disks having a first capacity; and
a second plurality of disks having a second capacity,
wherein the first array configuration uses the first plurality of disks and the second plurality of disks, and
wherein the second array configuration uses either the first plurality of disks or the second plurality of disks,
wherein the first capacity is different than the second capacity.

7. The system as recited in claim 6, wherein the data migrating component is further configured to determine that the one or more free extents are needed for data migration based at least in part on whether all reserved extents in the storage pool are currently being used.

8. The system as recited in claim 1, wherein the second array configuration is characterized by having a different number of disks than the first array configuration,
wherein the second array configuration is characterized by having a different storage capacity than the first array configuration,
wherein the second array configuration is characterized by having a different RAID level than a RAID level of the first array configuration,
wherein the RAID comprises:
a first plurality of disks having a first capacity; and
a second plurality of disks having a second capacity,
wherein the first array configuration uses the first plurality of disks and the second plurality of disks, and wherein the second array configuration uses either the first plurality of disks or the second plurality of disks.

9. A method, comprising:

reading data from a first portion of an in-use redundant array of independent disks (RAID), wherein the first portion of the in-use RAID is arranged according to a first array configuration having at least a first parameter;

using one or more reserved extents in a storage pool to store at least a first portion of the data for writing to the in-use RAID;

using one or more free extents in the storage pool and/or in the in-use RAID to store at least a second portion of the data for writing to the in-use RAID; and writing the data to a second portion of the in-use RAID, wherein the second portion of the in-use RAID is arranged according to a second array configuration having at least a second parameter.

10. The method as recited in claim 9, wherein the first and second parameters comprise at least one of: a number of disks, a disk storage capacity, an array storage capacity, and a RAID level.

11. The method as recited in claim 9, wherein the second array configuration is characterized by having at least one of: a different number of disks than the first array configuration, a different storage capacity than the first array configuration, and a different RAID level than a RAID level of the first array configuration.

12. The method as recited in claim 9, comprising determining that the one or more free extents are needed for data migration based at least in part on whether all reserved extents in the storage pool are being used.

13. The method as recited in claim 9, comprising:

receiving an I/O request, determining whether the received I/O request refers to unmigrated data or migrated data, the unmigrated data being the data from the first portion of the in-use RAID that has not been written to the second portion of the in-use RAID, the migrated data being the data from the first portion of the in-use RAID that has been written to the second portion of the in-use RAID, performing the I/O request according to the first array configuration upon determining that the I/O request refers to the unmigrated data; and performing the I/O request according to the second array configuration upon determining that the I/O request refers to the migrated data.

14. The method as recited in claim 9, further comprising making the first portion of the in-use RAID available for further data migration after the data is written to the one or more reserved extents and the one or more free extents.

15. A computer program product, the computer program product comprising a non-transitory computer readable storage medium having computer readable program code embodied therewith, the computer readable program code readable and/or executable by a processor to cause the processor to:

read data from a first portion of an in-use redundant array of independent disks (RAID), wherein the first portion of the in-use RAID is arranged according to a first array configuration having at least a first parameter;

use one or more reserved extents in a storage pool to store at least a first portion of the data for writing to the in-use RAID;

use one and/or more free extents in the storage pool or in the in-use RAID to store at least a second portion of the data for writing to the in-use RAID; and write the data to a second portion of the in-use RAID, wherein the second portion of the in-use RAID is arranged according to a second array configuration having at least a second parameter that is different than the first parameter.

16. The computer program product as recited in claim 15, wherein the first and second parameters comprise at least one of: a number of disks, a disk storage capacity, an array storage capacity, and a RAID level.

17. The computer program product as recited in claim 15, wherein the second array configuration is characterized by having a different number of disks than the first array configuration.

18. The computer program product as recited in claim 15, wherein the second array configuration is characterized by having a different storage capacity than the first array configuration.

19. The computer program product as recited in claim 15, wherein the second array configuration is characterized by having a different RAID level than a RAID level of the first array configuration.

20. The computer program product as recited in claim 15, wherein the second array configuration is characterized by having a different number of disks than the first array configuration, wherein the second array configuration is characterized by having a different storage capacity than the first array configuration, wherein the second array configuration is characterized by having a different RAID level than a RAID level of the first array configuration.

* * * * *